Patented July 23, 1940

2,209,170

UNITED STATES PATENT OFFICE 2,209,170

SILICEOUS PRODUCTS AND METHOD OF MAKING SAME

Howard S. Nevin, Detroit, and George Kaloustian, Highland Park, Mich., assignors to Cobrecite Corporation, Detroit, Mich., a corporation of Nevada No Drawing. Application July 8, 1939, Serial No. 283,380

4 Claims. (Cl. 106—24)

This invention relates to inorganic, sound absorbing or acoustical material, and particularly to material of the type referred to which is prepared primarily from a volcanic glass, or the like, and is adapted to absorb rather than reflect an unusually high percentage of the sound waves striking the same. The invention also relates to methods of making acoustical material of the type described.

It is an important object of the present invention to provide a highly porous sound absorbing or acoustic tile or board which is made of a light, strong, and naturally vesicular and/or porous material having a firm bond not subject to disintegration by moisture or ordinary knocks or abrasion.

Another object of the invention is to provide an acoustic tile or board which is made primarily of volcanic glass, or the like, and is not only firmly bonded but of a desirable light or substantially white color.

A further object of the invention is to provide a tile or board of the type described which not only possesses the desirable properties hereinbefore referred to, but also displays exceptional sound absorption powers, far exceeding those of conventional tile as it is now known.

Still further objects and advantages of the invention will appear from the following description and appended claims. Moreover, it is to be understood that the invention is not limited in its application to the details of said description since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

In the past, many attempts have been made to develop a suitable inorganic block or tile of the type mentioned, but so far as applicant is aware, none of the prior attempts have resulted in a product which is comparable to or competitive with the organic sound absorbing materials now on the market. Among the early attempts to solve this problem was to form a porous acoustical block formed by bonding granules of a siliceous aggregate by means of Portland cement. Such a product, however, has inferior sound absorbing characteristics because of the nature of cement, which tends to inhibit the natural sound absorbing powers of the pumice, and because of the difficulty of securing an adequate bond between the particles by means of Portland cement without materially closing or plugging the openings or spaces between the particles of the aggregate. Another expedient involves the use of an alkali silicate to bond a siliceous aggregate. In this material, the aggregate particles are coated with the silicate solution, which is then dehydrated at a temperature of the order of 300° F. or less, to provide a silicate bond between the particles. This material, however, is unsatisfactory, due in part to the fact that the silicate bond is soluble in water, and hence the material tends to crumble and break when exposed to humid weather or moisture.

It has also been suggested that an acoustical block be formed by binding together by heat and some form of fluxing element aggregate particles of quartz, feldspar, sand, or glass. Aggregate particles of the type mentioned are inferior, however, in that they have little or no sound absorbing properties with the result that the block prepared therefrom has inferior acoustical properties. Moreover, they are dense and relatively heavy, with the result that the final product is likewise of greater weight than is desirable.

Another suggestion was to use a more or less porous or vesicular aggregate, which is bonded together by means of a glazed ceramic bond. Porous or vesicular aggregates are of advantage in that they reduce the weight of the product and tend to increase its sound-absorbing power, but the natural sound-absorbing properties of such aggregate particles are impaired by coating them with a ceramic glaze. Moreover, the product is difficult and expensive to manufacture in view of the high temperatures required to fuse a ceramic bonding material.

Applicant's material, on the other hand, overcomes these defects by using a more or less porous or vesicular aggregate which is light in weight and has itself a relatively high sound-absorbing characteristic, and combining that aggregate with an alkaline reacting fluxing agent which reacts with the aggregate itself at the surface of the particles to form a complex alumino-silicate bond which has a relatively low fusing temperature and is entirely insoluble in water. Due to the fact that the fluxing agent reacts with the aggregate itself to form the bond, the aggregate particles are not coated or blanketed and, therefore, the sound absorbing properties of the aggregate are not destroyed. On the contrary, the aggregate particles themselves, under the action of the fluxing agent, fuse together at their points of contact, leaving interconnected spaces or voids therebetween. In addition, the reaction between the flux and the aggregate produces a stronger and better bond without causing any substantial melting down or change in form of the porous particles. The result is an exceedingly porous block which is of high strength, light weight, and an excellent acoustical material.

In general, the acoustic tile of the present invention is prepared by admixing a predetermined amount of a volcanic glass, such as pumice, obsidian, or the like, in particle form with a relatively smaller amount of a bonding agent or flux. Volcanic glass is more or less porous and/or vesicular, and therefore unusually well adapted for the purposes of the invention. The preferred fluxing agent is caustic soda, but caustic-potash, soda ash, borax, sodium silicate or mixtures thereof may also be used. The flux is preferably added in aqueous solution, but in the event it is relatively insoluble in water, as in the case of soda ash, the aggregate particles are first wetted with water, and then the flux is added in a finely powdered condition. Sufficient water should be present in any case, however, to thoroughly wet the aggregate or body material, as otherwise it is difficult to thoroughly mix the ingredients together. The flux must also be of such character as to melt at a lower temperature than the aggregate, and must be capable of entering into reaction with siliceous and aluminous constituents of the aggregate at the firing temperatures employed to form a complex alumino-silicate which is water insoluble and has the bonding properties desired. The resulting mixture is then fired under controlled conditions, involving control of the duration and temperature of firing, the amount of caustic soda or other flux employed, and the relative size of the aggregate particles being bonded to obtain a product having interconnected pores extending completely therethrough. Substantially identical results may thus be obtained over constant periods of firing and with aggregate particles of relatively constant size by either raising the temperature and decreasing the amount of flux or by lowering the temperature and increasing the amount of flux. The duration of firing may also be varied, in the event that any further change in temperature or the amount of flux is considered undesirable. The size and number of pores present in the finished tile, however, is almost entirely determined by the relative particle size of the aggregate, which should be fairly constant for any particular batch in order to avoid the possibility that any unusually small particles will fill in the pores between larger particles.

Satisfactory results for acoustic purposes have been obtained by crushing and screening the aggregate until substantially all of it passes through a 14 mesh screen and is retained by a 60 mesh screen. This not only results in particles of sufficient size, but insures that they are all of substantially constant or similar size. Particles of the desired size range are then admixed with the fluxing agent by one of the methods described above, preferably using about 5 parts by weight of aggregate to 1 part by weight of flux. When using this ratio, a satisfactory bond can be obtained by firing the mixture up to temperatures between approximately 1200° and 1400° F. over a period of from approximately 1½ to 3 hours.

If desired, the relative amount of flux employed may be increased until 1 part of flux is admixed with as little as 3 parts of aggregate. Such mixtures do not require temperatures as high as the preferred ratio of 5 to 1, yet they are somewhat less desirable due to the greater cost of the flux. Lesser amounts of flux may also be used with excellent results, for example, 1 part of flux to 9 parts of aggregate, which must be fired up to about 1300° to 1700° F. depending upon the kind of flux used, or even as little as 1 part of flux to 19 parts of aggregate, but in this instance also results are not entirely satisfactory, as such ratios require considerably higher firing temperatures, e. g. of the order of 1600° to 1900° F., which also adds to the cost of manufacture. Further, when using less flux than usual, it is much more difficult and sometimes practically impossible to obtain as white an end product as can be obtained by the preferred methods. The preferred range is from 5 to 9 parts of aggregate to 1 part of flux. If caustic soda is used as the flux and the ratio of flux to aggregate is within the preferred range the product may be fired at temperatures between 1200° F. and 1400° F. It may be stated in general, however, that any one of the factors or variables mentioned may be varied within limits with substantially identical results, primarily by simultaneously adjusting the other factors accordingly.

When using a ratio of 5 parts of aggregate to 1 part of flux, it has been found that water in an amount by weight about equal to the amount of flux will satisfactorily wet the aggregate. Thus, the ratio of water to flux is preferably about 1 part of water to 5 parts of aggregate. Although the relative amount of water used may be changed somewhat, it is important that the amount of water be not varied too greatly from the above ratio, as in the event too little water is added, the flux will not be uniformly distributed through the aggregate. If too much water is added, on the other hand, a slurry will be formed, which is hard to work with and also tends to disintegrate the particles of pumice or like material.

A more complete understanding of the invention can be obtained from the following examples:

*Example 1*

5 parts by weight of volcanic glass of graded size, preferably passing through a 14 mesh and retained on a 60 mesh screen, are coated or wetted with a technical solution of caustic soda, containing 1 part of caustic soda and 1 part of water. The ratio of reactive ingredients used is accordingly 5 to 1, i. e. 83⅓% of volcanic glass and 16⅔% of caustic soda in the undissolved state, any water present being driven off without entering the reaction. The coated aggregate is then placed into open pans, and immediately fired in a furnace or kiln in accordance with the following table, no preliminary heating being required:

| Temperature of firing | Duration of firing |
|---|---|
| | *Minutes* |
| 1000° F. to 1100° F | 35 |
| 1100° F. to 1150° F | 20 |
| 1150° F. to 1180° F | 15 |
| 1180° F. to 1200° F | 15 |
| 1200° F. to 1220° F | 10 |
| At 1220° F | 35 |

After being fired in the above manner, the product is preferably slowly cooled over a period of about six hours. During the firing the caustic soda tends to react with a portion of the siliceous and aluminous materials present in the volcanic glass to form complex alumino-silicates, which on cooling form a very tenacious water-insoluble bond between the individual particles of the aggregate, yet leave continuous intercommunicating pores therebetween. The product has a density of about 27 lb. per cubic foot.

*Example 2*

Volcanic glass is ground until it all passes through a 14 mesh screen and is retained by a 30 mesh screen. 5 parts by weight of the resulting material are then admixed with 2 parts by weight of a caustic soda solution, which is obtained by adding 1 part by weight of water to an equal amount of flaked caustic soda, the caustic soda solution being preferably applied by spraying under pressure. The mixture is then placed in pans and fired in a semi-muffled furnace, preferably having an oxidizing atmosphere, at temperatures slowly rising from 1100° to 1220° F. over a period of approximately two hours. The firing takes place in accordance with the following table:

| Temperature of firing | Duration of firing |
| --- | --- |
|  | Minutes |
| At 1100° | 35 |
| 1100° to 1150° | 20 |
| 1150° to 1220° | 40 |
| At 1220° | 35 |

As a result of the above firing, the mass of material shrinks and simultaneously becomes bonded at the points of contact of the individual particles of original aggregate, thereby leaving intercommunicating pores or voids therebetween. The material is then taken from the furnace or oven, and cooled in an air circulating cooler, which requires about 3½ to 6 hours. Upon being removed from the cooler, the mass has a density of approximately 35 lb. per cubic foot and is sawed to size suitable for acoustical purposes.

Example 3

Volcanic glass capable of passing through a 30 mesh screen and retained on 60 mesh screen is admixed with soda ash (containing 58% sodium carbonate and 40% NaOH) in the ratio of 5 to 1. To facilitate thorough mixing, the particles of volcanic glass are first wetted with a quantity of water about equal to the quantity by weight of the soda ash, and the soda ash is then added in a finely powdered condition. The resulting mixture is then fired in the usual manner, but using a maximum temperature of 1400° F., since soda ash is slightly less reactive than caustic soda, and therefore requires higher firing temperatures. The final product has somewhat smaller pores than the products of the first two examples due to the smaller particle size of the untreated aggregate, and has a density of about 50 lbs. per cubic foot.

Example 4

Volcanic glass capable of entirely passing through a 14 mesh screen and retained by a 30 mesh screen is wetted by means of a silicate of soda solution of 42.5 degrees Baumé, and is then fired in accordance with the following table, the ratio of the volcanic glass to silicate of soda being about 1 to 1:

| Temperature of firing | Duration of firing |
| --- | --- |
|  | Minutes |
| 1000° to 1100° F | 10 |
| 1100° to 1200° F | 25 |
| 1200° to 1300° F | 25 |
| 1300° to 1350° F | 15 |
| At 1350° | 60 |

The product is cooled in the same manner as that of Example 2, and has a density of about 50 lbs. per cubic foot.

It will be observed that unusually large amounts of silicate of soda as well as relatively higher maximum temperatures are required in accordance with the above example. This renders silicate of soda somewhat less desirable than the other fluxing agents mentioned, which are usually not employed in amounts greater than 1 part of flux to 3 parts of aggregate, and preferably are used in even lesser amounts.

Example 5

9 parts by weight of volcanic glass of a size range of the order of 14 to 30 mesh are admixed with 1 part by weight of caustic soda dissolved in sufficient water to thoroughly wet the particles of volcanic glass. The mixture is then fired over a period of about 2¼ hours at gradually increasing temperatures varying from 1000° to 1350° F., the furnace being maintained at 1350° F. during the last hour of the firing. The resulting material is then gradually cooled in the manner previously described.

It is to be understood that the methods described in the above examples may in practically all instances be readily varied in one or more of the following ways: (1) by lowering the firing range and increasing the percentage of caustic soda or other flux; (2) by lowering the percentage of caustic soda and simultaneously raising the firing range; (3) by varying the duration of firing to compensate for changes in the variables of (1) and (2), and (4) by varying the particle size to obtain a product of greater or less density and porosity.

During the firing care should be taken not to heat the material at temperatures high enough to cause puffing, as a puffed product is non-porous and therefore not nearly as suitable for acoustic purposes. Puffing temperatures vary inversely with the amount of flux added, and at the preferred ratio of 5 parts of aggregate to 1 part of flux, using caustic soda, are generally above 1400° F. When using the firing or bonding temperatures and the relative amounts of flux described herein, however, the material being treated actually shrinks instead of puffing.

The methods described herein render it possible to obtain an acoustic board which reflects an exceedingly small percentage of the sound that strikes it, and which at the same time is strong and light in weight and of such color as to render it suitable for use in all possible places where acoustic material may be required. The product may also be readily tinted, and is always free of undesirable marks or discolorations. Further, it is entirely moisture resistant, and will not disintegrate or break down upon being used in the walls and ceilings of swimming pools or other extremely moist places.

The term "volcanic glass" used throughout the specification and in the appended claims is intended to cover such volcanic materials as pumice, obsidian, or the like, which are either porous or vesicular, or may be both porous and vesicular. One such material present in large deposits near Cobre, Nevada, has been found to be most suitable, since it is unusually soft, having been deposited under water. This material is laid down in the form of microscopic thin plates which cohere to produce a somewhat porous loosely bonded material. However, volcanic glass and pumices of other regions may be used with almost equal success, as substantially all kinds and forms thereof are sufficiently light, strong, porous and/or vesicular for the purposes of the present invention.

The use of caustic soda as the fluxing agent is preferred, as it produces a whiter and stronger product at a lower temperature, but satisfactory results may be obtained with soda ash, particularly soda ash containing rather large amounts of caustic soda admixed therewith. Borax and sodium silicate may also be used to advantage, although sodium silicate is less desirable, since it must be used in such large quantities. In any case, however, it is essential that the flux used should be capable of reacting in situ with the siliceous and aluminous ingredients of the volcanic glass during the firing, as otherwise a sufficiently strong and water resistant bond is not obtained.

What is claimed is:

1. The method of making a unitary, vitrified block having a multiplicity of intercommunicating pores or voids therein which comprises mixing from five to nine parts of crushed volcanic glass with approximately one part of water and approximately one part of an alkaline reacting fluxing agent, and firing the resulting mixture at a temperature sufficient to cause the formation of a water insoluble bond between said particles primarily at their points of contact by interaction between said particles and said agent.

2. The method of making a unitary, vitrified block having a multiplicity of intercommunicating pores or voids therein which comprises mixing from five to nine parts of crushed volcanic glass with approximately one part of water and approximately one part of an alkaline reacting fluxing agent from the group consisting of caustic soda, caustic potash, soda ash, borax, and sodium silicate, and firing the resulting mixture at a temperature sufficient to cause the formation of a water insoluble bond between said particles primarily at their points of contact by interaction between said particles and said agent.

3. The method of making a unitary, vitrified block having a multiplicity of intercommunicating pores or voids therein which comprises mixing from five to nine parts of crushed volcanic glass with an aqueous solution of approximately one part of water and approximately one part of caustic soda, and firing the resulting mixture at a temperature sufficient to cause the formation of a water insoluble bond between said particles primarily at their points of contact by interaction between said particles and said agent.

4. The method of making a unitary, vitrified block having a multiplicity of intercommunicating pores or voids therein which comprises mixing from five to nine parts of crushed volcanic glass, graded to pass a fourteen mesh screen and to be retained on a sixty mesh screen, with approximately one part of water and approximately one part of an alkaline reacting fluxing agent, and firing the resulting mixture at a temperature sufficient to cause the formation of a water insoluble bond between said particles primarily at their points of contact by interaction between said particles and said agent.

HOWARD S. NEVIN.
GEORGE KALOUSTIAN.